July 14, 1931.　　　J. L. DRAKE　　　1,814,905
PROCESS AND APPARATUS FOR FORMING SHEET OR PLATE GLASS
Filed April 5, 1926　　　2 Sheets-Sheet 1
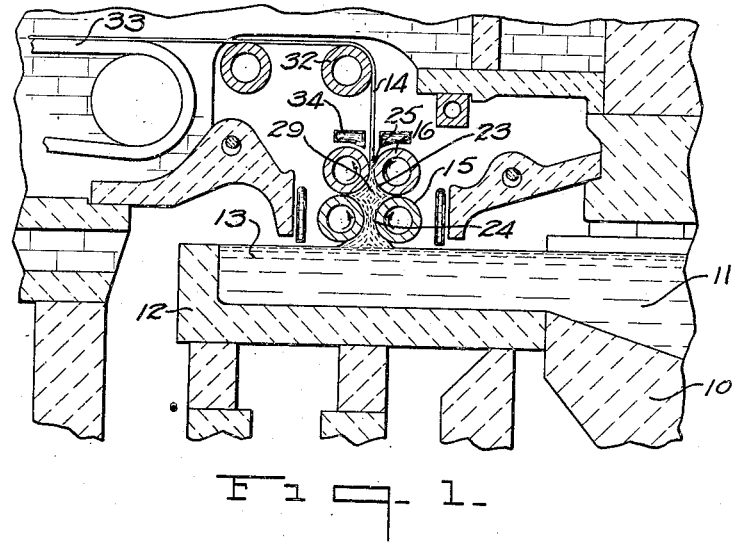
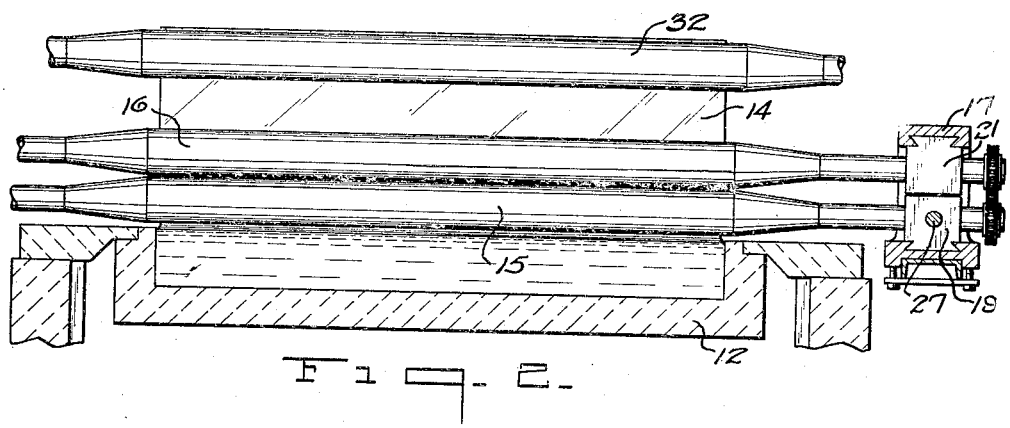
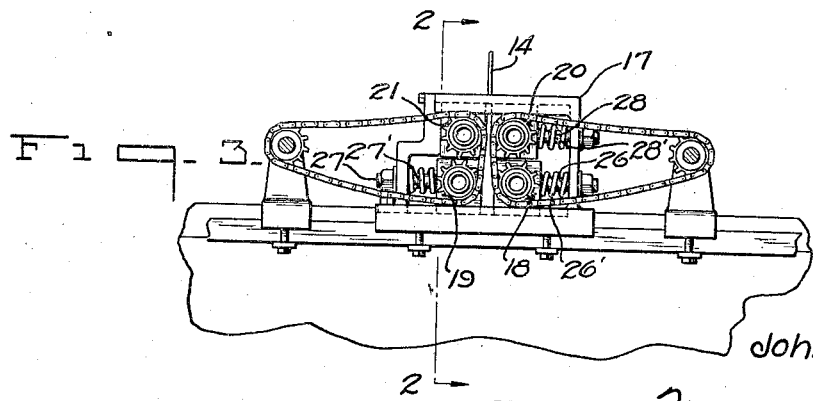
Inventor
John L. Drake.
By Frank Fraser,
Attorney

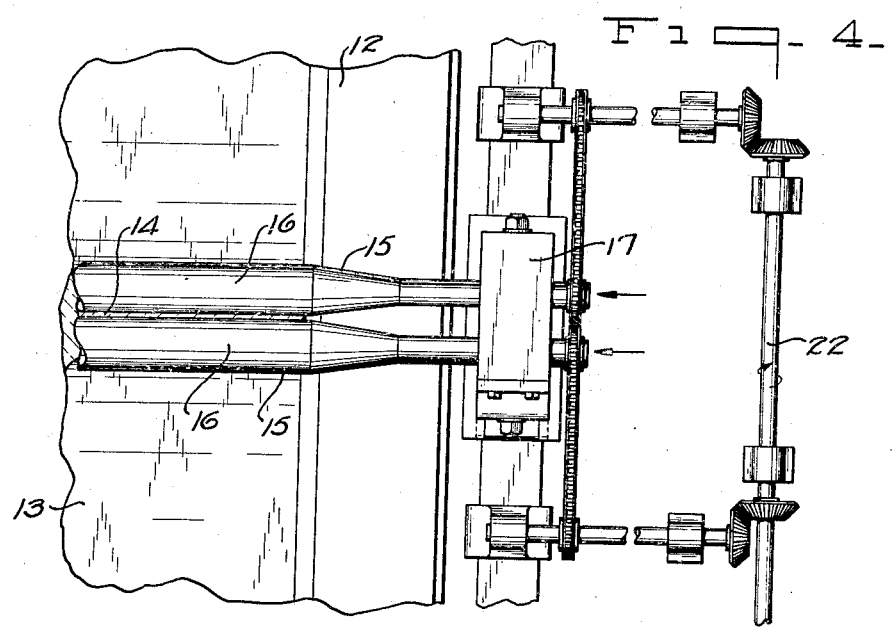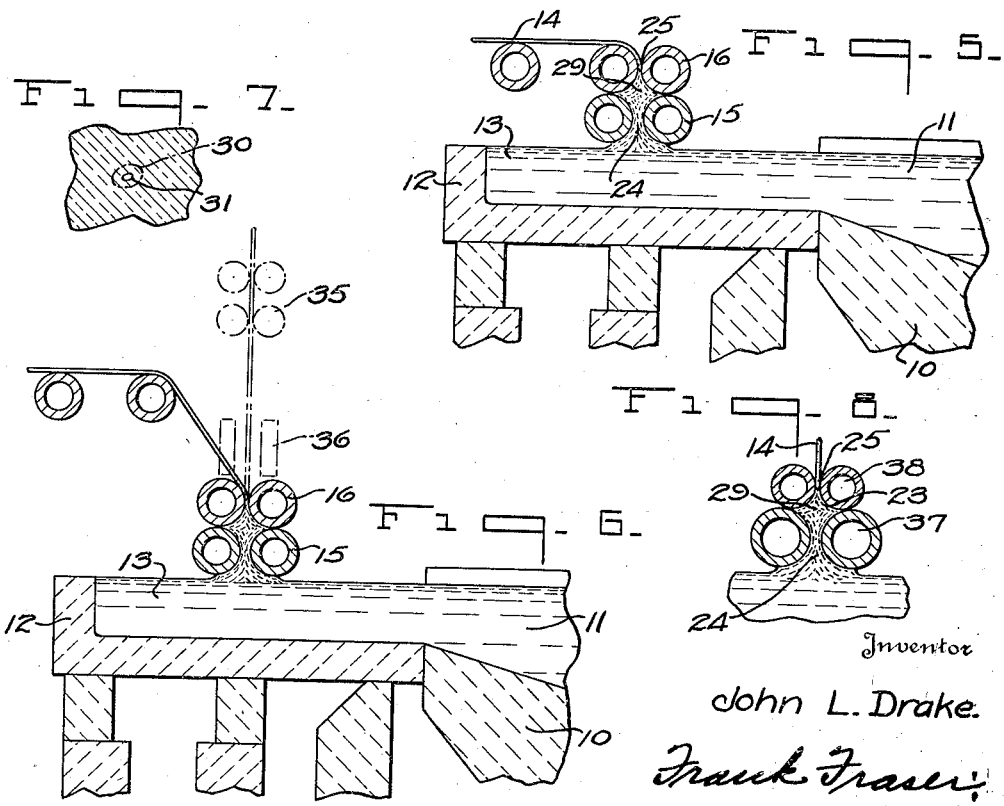

Patented July 14, 1931

1,814,905

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING SHEET OR PLATE GLASS

Application filed April 5, 1926. Serial No. 99,714.

The present invention relates to improvements in the art of forming a sheet of glass.

An important object of the invention is to form, from a mass of molten glass which is under pressure, a continuous ribbon of glass.

Another object of the invention is to provide a continuous sheet glass forming apparatus with means whereby the molten glass, from which a continuous sheet of glass may be formed, is maintained under a sustained high static pressure.

Another object of the invention is to reduce the size of imperfections, known in the art as bubbles, blisters and seeds, ordinarily present in a sheet of glass.

A further object of the invention is to provide a continuous sheet glass forming apparatus with means whereby a sheet or ribbon of glass may be continuously formed which will be of uniform thickness.

A still further object of the invention is to provide a continuous sheet glass forming apparatus with means whereby a sheet or ribbon of glass may be continuously formed which will be substantially equal in width at all times.

Other objects and advantages of the invention will become apparent during the course of the following description.

In the drawings wherein like numerals are employed to designate like parts throughout the same, Fig. 1 is a longitudinal sectional elevation of a sheet forming apparatus showing the improved device, Fig. 2 is a transverse sectional elevation taken substantially on line 2—2 in Fig. 3, Fig. 3 is an end elevation of the apparatus showing a driving mechanism therefor, Fig. 4 is a plan view of the apparatus showing another view of the driving mechanism, Figs. 5, 6 and 8 are modifications of the invention, and Fig. 7 is an enlarged schematic view taken through a section of molten glass.

Referring to the drawings in detail, the numeral 10 refers to a glass tank furnace in which suitable raw materials are converted into a mass of molten glass 11, which supplies a pot or other form of receptacle 12 with molten glass 13 from which a ribbon of glass 14 is finally formed.

It is a well known fact in melting glass that, during the fusing period of the raw materials in the tank furnace 11, and the transit of the resultant mass of molten glass therethrough to the pot 12, numerous gas or air pockets, of varying size, form in this mass of glass. The molten glass is of such a nature that it will not permit these pockets of gas to become entirely liberated therefrom, and as a result there appears in the finished glass articles, what are known in the art, as bubbles, blisters, or seeds dependent upon the size of the bubble. The salability of the finished glass article, particularly in the case of sheet or plate glass, is greatly affected by the size of these seeds, bubbles or blisters.

The important object of this invention is to reduce a heterogeneous group of gas pockets collected in a mass of molten glass to their smallest possible form, that is, to substantially reduce these pockets, namely, from the bubbles to blister sizes, the blisters to seed sizes, and the seeds to infinitesimal particles, and contemporaneously permit a sheet of glass to be continuously produced from said mass of molten glass, while the pockets therein are in reduced form.

A preferred apparatus for accomplishing the above mentioned object, and the other advantages of the invention, is illustrated in the drawings. Extending across and in close proximity to the molten glass 13 in the pot 12, is a pair of rotatable members or rolls 15. Superimposing and cooperating therewith is a second pair of rotatable members or rolls 16. The pairs of rolls are supported in a supporting bracket 17 by their respective bearings 18, 19, 20 and 21, and are driven in unison in the directions indicated by the arrows in Fig. 1, by some convenient form of drive 22 similar to that shown in Figs. 3 and 4, and are preferably internally cooled by circulating a cooling medium therethrough in some suitable manner.

The pairs of rolls are so arranged that between their coacting peripheries is formed a chamber 23 having an inlet 24 and an outlet 25. The widths of said inlet and outlet may be controlled by the proper adjustment of the bolts 26, 27 and 28, provided with springs 26', 27' and 28', associated with the roll bearings 18, 19 and 20. It will be noticed by referring to Fig. 1 of the drawings that the width of the outlet 25 is somewhat less than the width of the inlet 24, thus permitting a greater volume of glass to be fed from the pot 12 to the chamber 23 by the pair of rolls 15 than is discharged therefrom between the pair of rolls 16. Consequently, a sheet supplying source of molten glass 29 will be permitted to collect in the chamber 23. As the rolls normally are held in a substantially fixed position, the glass 29 in the chamber 23 will be under pressure. The rolls, however, are resiliently held so that foreign matter, such as clay, can pass therebetween without damage. Therefore, any gas pockets in the molten glass entering through the inlet 24 from the pot 12, will be compressed and thus reduced to their smallest possible form upon reaching this chamber 23, or in other words, a gas pocket, having substantially the size of the circle 30, designated in Fig. 7 of the drawings, before entering the pocket 23, will be reduced thereafter to substantially the size of the circle 31 as result of this built up static pressure on the mass of molten glass 29. Of course Fig. 7 is purely diagrammatic, and shows in a relative manner substantially what takes place when a gas or air pocket in molten glass is placed under pressure.

The rigidity or body of the ribbon of glass 14, issuing from the outlet 25, must be sufficient to withstand any tending reaction of the pockets to expand after once being compressed. It is believed that the normal cooling action of the pair of rolls 16 upon the glass in the outlet 25 will be intense enough to satisfactorily set the sheet of glass 14 as it is formed between said pairs of rolls 16, and thus prevent any possible reaction of the compressed pockets. The sheet, after being formed, may be carried vertically and then horizontally over a bending member 32 to a suitable flattening conveyor 33. If found necessary additional cooling may be had by employing the use of heat absorbing members 34, suitably positioned in relation to the pair of rolls 16. The thickness of the sheet 14 is solely dependent upon the width of the outlet 25 between the pair of rolls 16.

The modification shown in Fig. 5 illustrates a manner in which the sheet 14, after being formed, may be transferred from the vertical to the horizontal planes, and hence to the flattening conveyor by bending it over one of the pair of rolls 16. Fig. 6 illustrates another manner in which the sheet may be transferred from the vertical to the horizontal planes by bending it at two obtuse angles in place of one abrupt right angle, as shown in Figs. 1 and 5.

The sheet may also be carried away from the pair of rolls 16 by carrying it straight up vertically, as shown by the dotted lines in Fig. 6, by employing the use of suitable rolls 35. In this event, cooling members 36 may be used to cause said sheet to become permanently rigid soon after being formed.

The modification of the invention shown in Fig. 8 illustrates another manner whereby a greater pressure, if necessary, may be built up on the mass of molten glass 29 in the pocket 23. The pair of rolls 37, having a larger diameter than the pair of rolls 38, will permit the molten glass to be fed at a greater velocity to the pocket 23 than that covered in the main embodiment of the invention. Therefore, by keeping the sizes of the inlet 24 and outlet 25 substantially the same as shown in Fig. 1, a somewhat greater pressure on the molten glass 29 in said pocket 23, it is believed will result.

A sheet of glass formed in accordance with the present invention will be of uniform thickness, and the width thereof will be substantially equal at all times, as there is little or no tendency for the sheet to narrow at any time during or after its formation.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In an apparatus for forming sheet glass, means containing a mass of molten glass, a plurality of pairs of superimposed rotatable rolls arranged above the molten glass and adapted to receive between their coacting circumferences an upwardly moving supply of molten glass from said means, and means for causing the rolls to maintain said supply of molten glass under pressure.

2. In sheet glass apparatus, means containing a mass of molten glass, and a plurality of pairs of superimposed rotatable members arranged above said molten glass and adapted to receive a supply of glass therefrom and reduce it to sheet form, the rotatable members of the upper pair being tangent with the rotatable members of the lower pair to form a pocket for receiving the supply of molten glass therein and within which pocket the glass is maintained under pressure.

3. In sheet glass apparatus, means containing a mass of molten glass, and a plurality of pairs of superimposed rotatable members arranged above said molten glass and adapted to receive a supply of glass therefrom and reduce it to sheet form, the rotatable members of the upper pair being tangent with the rotatable members of the lower pair, and the space between the lower pair of members being greater than the space between the upper pairs of members.

4. In sheet glass apparatus, a pot containing a mass of molten glass, a plurality of pairs of superimposed rotatable members arranged above the pot and adapted to receive a supply of molten glass therefrom and contain the same under pressure between their coacting peripheries, the members of the upper pair being tangent with the corresponding members of the lower pair, the upper pair of members having an orifice therebetween through which the glass is adapted to issue in sheet form.

5. In sheet glass apparatus, a receptacle containing a mass of molten glass, and a plurality of pairs of superimposed rotatable members arranged above said mass of molten glass and adapted to receive a supply of glass therefrom and reduce it to sheet form, the rotatable members of the upper pair cooperating with the rotatable members of the lower pair to form a substantially closed pocket between their coacting peripheries for receiving the supply of molten glass therein and within which pocket the glass is maintained under pressure.

6. In sheet glass apparatus, a receptacle containing a mass of molten glass, a plurality of pairs of superimposed rotatable members arranged above said mass of molten glass, the rotatable members of the upper pair cooperating with the rotatable members of the lower pair to form a substantially closed pocket between their coacting peripheries, and means for rotating said rotatable members in a manner to feed a supply of molten glass upwardly into said pocket wherein it is maintained under pressure and then reduced to sheet form.

7. In the production of sheet glass, the process which consists in feeding a relatively heavy body of molten glass upwardly from a molten bath by and between continuously moving rolls, with the thickness of said body being relatively greater than that desired of the finished sheet, and in then reducing said body of glass by a rolling operation after it passes upwardly between said rolls to a sheet of substantially predetermined and uniform thickness.

8. In the production of sheet glass, the process which consists in feeding a relatively heavy body of molten glass upwardly from a molten bath by and between continuously revolving rolls associated with one another to create a feeding pass therebetween, with the thickness of said body being relatively greater than that desired of the finished sheet, and in then rolling said body of glass after it passes beyond the feeding pass to a sheet of substantially predetermined and uniform thickness.

9. In the production of sheet glass, the process which consists in feeding a relatively heavy body of molten glass upwardly from a molten bath to a sheet forming pass located thereabove by and between continuously moving rolls arranged to create a feeding pass therebetween, and in reducing the glass after it passes beyond the feeding pass and as it moves through said forming pass to a sheet of substantially predetermined and uniform thickness so that the glass leaving the pass is relatively thinner than the body of glass fed upwardly thereto.

10. In the production of sheet glass, the process which consists in feeding a relatively heavy body of molten glass upwardly from a molten bath by and between continuously revolving rolls to a sheet forming pass located above said rolls, and in rolling the glass as it moves through said pass to a sheet of substantially predetermined and uniform thickness so that the glass leaving the pass is relatively thinner than the body of glass fed upwardly thereto.

11. In the production of sheet glass, the process which consists in advancing a body of molten glass upwardly from a molten bath to a sheet forming pass wherein it is reduced to a sheet of substantially predetermined and uniform thickness, and in feeding the glass upwardly to said pass by and between continuously moving rolls engaging the glass at a point spaced from and in advance of said pass and operable in a manner that the body of glass fed upwardly is of a thickness relatively greater than the width of the sheet forming pass.

12. In the production of sheet glass, the process which consists in advancing a body of molten glass upwardly from a molten bath to a sheet forming pass created between continuously revolving rolls which reduce the glass within the pass to a sheet of substantially predetermined and uniform thickness, and in feeding the glass upwardly to said pass by and between additional continuously revolving rolls engaging the glass in advance of the pass and operable in a manner that the body of glass fed upwardly is of a thickness relatively greater than the width of the sheet forming pass.

13. In the production of sheet glass, the process which consists in positively feeding a relatively heavy body of molten glass of a width substantially equal to that desired of the finished sheet upwardly from a molten bath by rotatable means which engage said body throughout its entire width, and then rolling the same at a point above said rotatable means to a sheet of substantially predetermined thickness which is less than the thickness of said body.

Signed at Toledo, in the county of Lucas, and State of Ohio, this 3rd day of April, 1926.

JOHN L. DRAKE.